(12) United States Patent
Uryu

(10) Patent No.: US 11,165,342 B2
(45) Date of Patent: Nov. 2, 2021

(54) POWER CONVERSION DEVICE

(71) Applicant: Mitsubishi Electric Corporation, Tokyo (JP)

(72) Inventor: Yuta Uryu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/650,594

(22) PCT Filed: Nov. 14, 2017

(86) PCT No.: PCT/JP2017/040937
§ 371 (c)(1),
(2) Date: Mar. 25, 2020

(87) PCT Pub. No.: WO2019/097574
PCT Pub. Date: May 23, 2019

(65) Prior Publication Data
US 2020/0235657 A1     Jul. 23, 2020

(51) Int. Cl.
*H02M 1/44*     (2007.01)
*H02M 3/28*     (2006.01)

(52) U.S. Cl.
CPC ............... *H02M 1/44* (2013.01); *H02M 3/28* (2013.01)

(58) Field of Classification Search
CPC . H02M 1/44; H02M 3/28; H02M 1/00; H01F 30/10; H01F 27/02; H01F 27/26;
(Continued)

(56) References Cited

U.S. PATENT DOCUMENTS 6,378,774 B1 *    4/2002    Emori ................ G06K 7/10178
                                                                                                 235/441
2015/0170819 A1     6/2015    Yamashima et al.
(Continued)

FOREIGN PATENT DOCUMENTS

JP              7-3120 U      1/1995
JP         2002-75744 A      3/2002
(Continued)

OTHER PUBLICATIONS

Communication dated Jan. 26, 2021, from the Japanese Patent Office in Application No. 2019-554068.
(Continued)

*Primary Examiner* — Adolf D Berhane
(74) *Attorney, Agent, or Firm* — Sughrue Mion, PLLC; Richard C. Turner

(57) ABSTRACT

A power conversion device such that heat dissipation of an electromagnetic induction instrument can be increased, and inductance value durability and vibration resistance of the electromagnetic induction instrument is high, is provided. Also, a power conversion device reduced in size and weight is provided. A power conversion device includes an electromagnetic induction instrument wherein an upper core and a lower core having magnetism are electromagnetically coupled across a coil body, a frame body on which the electromagnetic induction instrument is mounted, a potting resin member with which a space between the frame body and the electromagnetic induction instrument is filled, and a fixing member, disposed above the electromagnetic induction instrument so as to cover the upper core, of which an end portion is attached to the frame body, wherein the electromagnetic induction instrument is fixed to the frame body by the fixing member.

18 Claims, 21 Drawing Sheets

(58) Field of Classification Search
CPC ........ H01F 27/30; H01F 27/011; H01F 27/22;
H01F 27/266
See application file for complete search history.

(56) References Cited

U.S. PATENT DOCUMENTS

2017/0140863 A1  5/2017  Aichi et al.
2018/0122551 A1  5/2018  Yoshikawa

FOREIGN PATENT DOCUMENTS

| | | |
|---|---|---|
| JP | 2013-94023 A | 5/2013 |
| JP | 2014-36194 A | 2/2014 |
| JP | 2014-160737 A | 9/2014 |
| WO | 2014/024341 A1 | 2/2014 |
| WO | 2016/002326 A1 | 1/2016 |
| WO | 2016/167199 A1 | 10/2016 |
| WO | 2017/104561 A1 | 6/2017 |

OTHER PUBLICATIONS

Communication dated Feb. 10, 2021, from the European Patent Office in Application No. 17932505.5.
Search Report (PCT/ISA/210) dated Jan. 30, 2018, issued by the International Patent Application No. PCT/JP2017/040937.
Written Opinion (PCT/ISA/237) dated Jan. 30, 2018, issued by the International Patent Application No. PCT/JP2017/040937.

* cited by examiner

POWER CONVERSION DEVICE

TECHNICAL FIELD

The present invention, relating to a power conversion device, relates to, for example, a power conversion device such as an inverter, a DC/DC converter, or a vehicle-mounted charger configured of a transformer, a reactor, or the like, mounted in an electric vehicle or a hybrid vehicle that has a motor as one drive source.

BACKGROUND ART

A power conversion device such as a DC/DC converter or a vehicle-mounted charger mounted in an electric vehicle Or a hybrid vehicle is such that an electromagnetic induction instrument is mounted as a passive component that carries out a voltage step-up operation or step-down operation. The electromagnetic induction instrument is a transformer, a reactor, a choke coil, or the like, and is used for accumulating or discharging energy, or for smoothing a direct current, or the like. With regard to this kind of electromagnetic induction instrument, reducing size or adopting a structure such that heat generated when energizing can be efficiently dissipated is extremely important in reducing the size or increasing the efficiency of the power conversion device.

As a method of reducing the size of an electromagnetic induction instrument such as a transformer or a reactor, which is a main component configuring a power conversion device, increasing a drive frequency of the relevant component is cited as an effective measure. By increasing the drive frequency, an inductance value (an amount of magnetic flux generated when a predetermined current flows), which is an index representing a capacity of an electromagnetic induction instrument, can be reduced. The inductance value is proportional to the square of a number of turns of a coil configuring the transformer or the reactor, and proportional to a sectional area of a core material, because of which the number of turns and the core sectional area of the transformer or the reactor can be reduced by increasing the frequency.

Due to increasing the frequency in order to reduce size, there is a marked increase in heat loss due to core material heat loss frequency characteristics, particularly when adopting a method whereby the core sectional area is reduced. Furthermore, a problem exists in that a rise in core temperature increases markedly due to an increase in core thermal resistance caused by reducing the core sectional area. Because of this, increasing heat dissipation, and to what extent a temperature rise is restricted, are important when increasing the frequency of the transformer or the reactor.

For example, Patent Literature 1 is cited as a power conversion device that has increasing heat dissipation of a core material configuring a transformer or a reactor as an object. A power conversion device disclosed in Patent Literature 1 is such that a transformer and an inductor element are disposed in a housing space formed by ribs set upright in a case. Further, the power conversion device of Patent Literature 1 is of a configuration such that heat lost from the transformer and the inductor element is efficiently caused to dissipate into a cooler by a gap between the transformer and inductor element and the housing space in the case being filled with a resin having heat dissipating properties and insulating properties.

For example, Patent Literature 2 is cited as another configuration that increases core heat dissipation. A reactor device disclosed in Patent Literature 2 is of a configuration such that a heatsink is brought into contact with an upper face and both side faces of an upper core forming a transformer upper portion, and the transformer is housed in a space of a case, after which the space is filled with a potting resin member until a lower end portion of the heatsink is submerged. Because of this, heat lost from particularly the upper core can be efficiently dissipated into the potting resin member and the case via the heatsink on the upper face. Furthermore, by limiting the amount of potting resin member used for filling to a height such that the lower end portion of the heatsink is submerged, the amount of potting resin member used for filling can be restricted, whereby a cost reduction and a weight reduction can be achieved.

CITATION LIST

Patent Literature

PTL 1: JP-A-2013-94023
PTL 2: JP-A-2014-36194

SUMMARY OF INVENTION

Technical Problem

However, the power conversion device of Patent Literature 1 is such that it is necessary to secure a height of the filling resin as far as a height needed for heat dissipation, and in the case of, for example, a transformer or a reactor having cores wherein a core abutment interface is parallel with a surface of the potting filling resin, there is a problem in that the cores are separated at a core abutment interface portion due to thermal expansion of the potting resin accompanying a rise in temperature when driving the power conversion device, and the inductance value decreases. The inductance value of the transformer or the reactor decreasing leads to problems of a change in characteristics of the power conversion device, specifically a decrease in power efficiency, a temperature rise caused by an increase in component heat loss, and furthermore, damage or the like of the power conversion device accompanying the temperature rise.

Also, the reactor device of Patent Literature 2 is such that by limiting the filling height of the potting resin member to below an abutment interface of upper and lower cores, a separation force of the core abutment interface when there is thermal expansion of the potting resin member in an interior can be restricted. However, the upper core is not covered with the potting resin member, and is of a configuration indirectly held to the potting resin member and the case by the heatsink on the upper face, because of which there is a problem in that vibration resistance cannot be secured under vibration and impact conditions when the vehicle is travelling, and the upper core rises up or is damaged.

The invention, having been contrived in order to resolve the aforementioned kinds of problem, has an object of providing a power conversion device such that heat dissipation of an electromagnetic induction instrument such as a transformer or a reactor configuring a power conversion device can be increased, and high durability of an inductance value of the electromagnetic induction instrument, and high vibration resistance of a core, can be realized. Also, the invention has an object of providing a smaller and lighter power conversion device as a result of the above.

Solution to Problem

A power conversion device according to the invention is characterized by including an electromagnetic induction instrument wherein an upper core and a lower core having magnetism are electromagnetically coupled across a coil body, a frame body on which the electromagnetic induction instrument is mounted, a potting resin member with which a space between the frame body and the electromagnetic induction instrument is filled, and a fixing member, disposed above the electromagnetic induction instrument so as to cover the upper core, of which an end portion is attached to the frame body, wherein the electromagnetic induction instrument is fixed to the frame body by the fixing member.

Also, a power conversion device according to the invention is characterized by including an electromagnetic induction instrument wherein an upper core and a lower core having magnetism are electromagnetically coupled across a coil body, a metal case on which the electromagnetic induction instrument is housed through one opened face, a frame body in which the metal case is mounted, and a potting resin member with which a space between the metal case and the electromagnetic induction instrument is filled, wherein the electromagnetic induction instrument is fixed to the frame body by the metal case, and the opened face of the metal case is disposed so as to be in a vertical direction with respect to a bottom face of the frame body.

Advantageous Effects of Invention

According to a power conversion device of the invention, an electromagnetic induction instrument is fixed to a frame body by a fixing member, whereby upper and lower cores separating at a core abutment interface, and an inductance value decreasing, due to thermal expansion of a potting resin member caused by a rise in temperature when the power conversion device is driven can be restricted, and the power conversion device can be stably driven. Also, a power conversion device such that vibration resistance of the electromagnetic induction instrument can be secured, even when the power conversion device is exposed to vibration and impact conditions when the vehicle is travelling, can be provided. Also, by filling with the potting resin member and connecting to the frame body, core heat dissipation can be increased, and a reduction in size, a reduction in weight, and a reduction in cost of the power conversion device can be realized.

DESCRIPTION OF EMBODIMENTS

Figure 1:
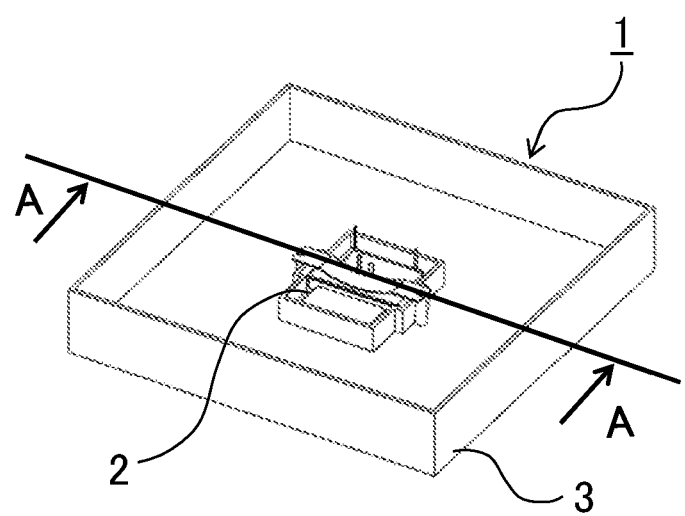
FIG. 1 is a perspective view showing a power conversion device in a first embodiment of the invention.

Hereafter, a first embodiment of the invention will be described, based on the drawings.

Identical reference signs in the drawings indicate identical or corresponding components.

First Embodiment

Figure 2:
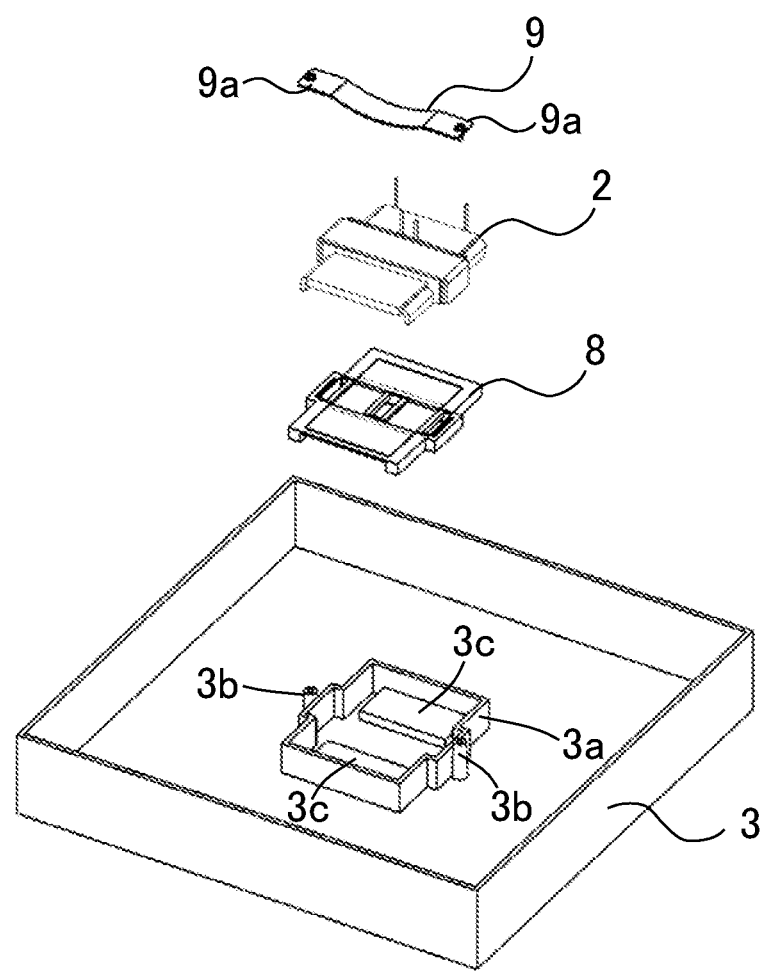
FIG. 2 is an exploded view of the power conversion device shown in FIG. 1.
Figure 3:
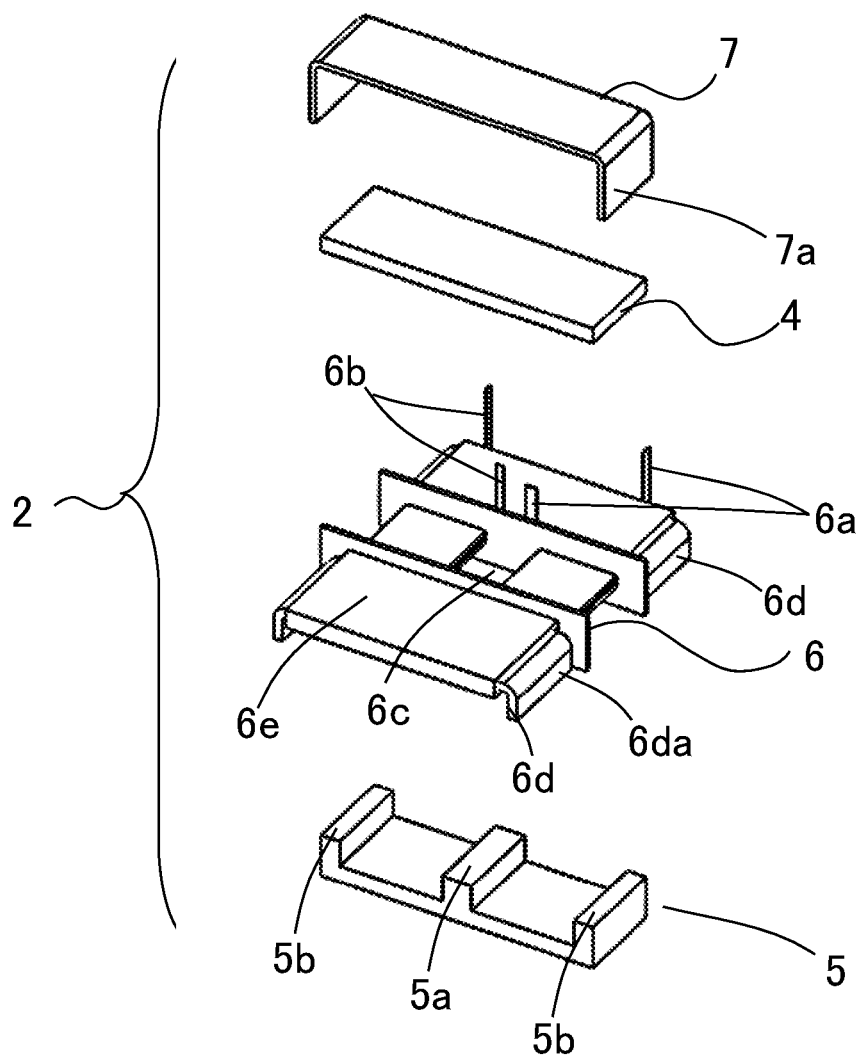
FIG. 3 is an exploded view of an electromagnetic induction instrument in the power conversion device shown in FIG. 1 and FIG. 2.
Figure 4:
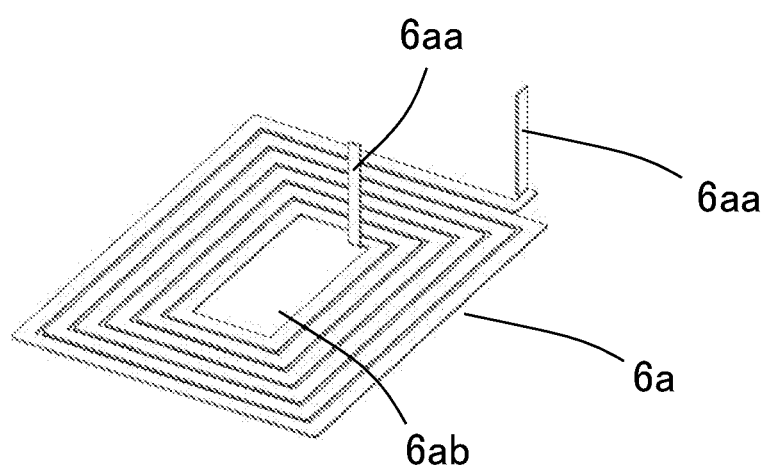
FIG. 4 is a perspective view showing a primary winding configuring a coil body shown in FIG. 3.
Figure 5:
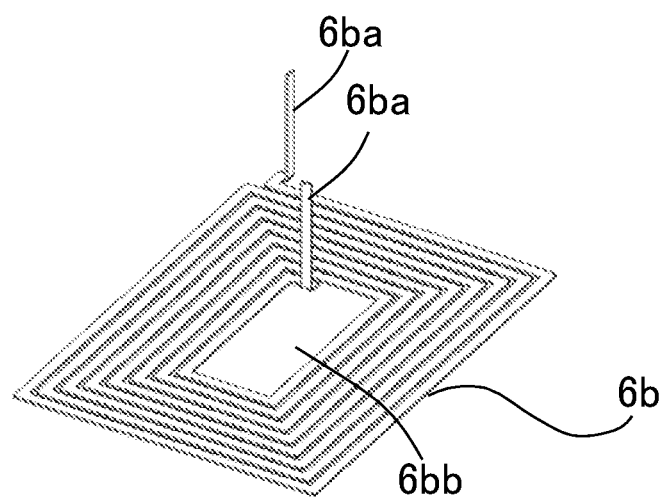
FIG. 5 is a perspective view showing a secondary winding configuring the coil body shown in FIG. 3.
Figure 6:
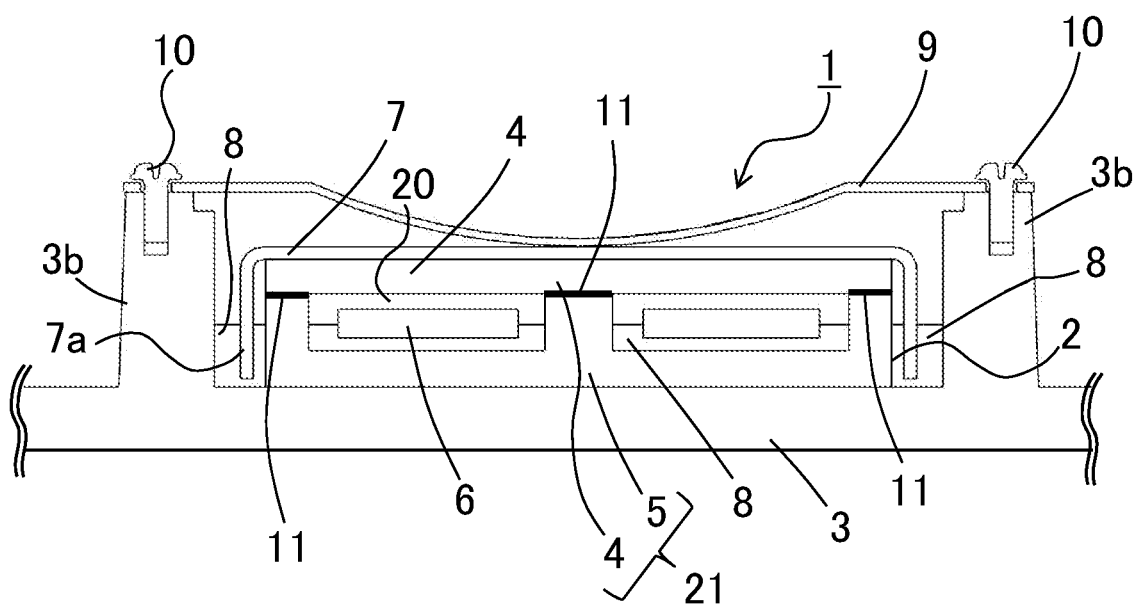
FIG. 6 is a sectional view showing a cross-section along an A-A line in the power conversion device shown in FIG. 1.

FIG. 1 is a perspective view showing a power conversion device in the first embodiment of the invention, and FIG. 2 is an exploded view of the power conversion device shown in FIG. 1. Also, FIG. 3 is an exploded view of an electromagnetic induction instrument mounted in the power conversion device of FIG. 1 and FIG. 2, and FIG. 4 is a primary winding configuring a coil body shown in FIG. 3. Further still, FIG. 5 is a secondary winding configuring the coil body shown in FIG. 3, and FIG. 6 is a sectional view showing a cross-section along an A-A line in the power conversion device shown in FIG. 1. A depiction of a substrate and other components mounted in the power conversion device is omitted from FIG. 1 and FIG. 6.

As shown in FIG. 1, a power conversion device 1 is configured by a transformer 2, which is an electromagnetic induction instrument, being mounted in a frame body 3, and the frame body 3 and a cover existing on a side opposite to that of the frame body 3 being joined and fitted together by screw fastening or the like, forming a sealed structural body. A cooler (not shown) wherein a fin made of metal or a channel such as a pipe is provided, and a cooling refrigerant such as water or air passes therethrough, is connected to a bottom face of the frame body 3. Also, the frame body 3 is configured of a component cast from a metal material having a predetermined rigidity and thermal conductivity, such as a diecast aluminum, or of a machined component.

As shown in FIG. 3, the transformer 2, which is an electromagnetic induction instrument, includes an I-type core 4 and an E-type core 5, which configure a closed magnetic path, and a coil body 6 including a primary winding 6a and a secondary winding 6b disposed so as to enclose a central leg portion 5a of the E-type core 5.

The I-type core 4 and the E-type core 5 configuring the transformer 2, which is an electromagnetic induction instrument, are formed of a magnetic material such as a ferrite, and a closed magnetic path is configured by the central leg portion 5a and side leg portions 5b of the E-type core 5 and the I-type core 4 being caused to abut. The primary winding 6a and the secondary winding 6b configuring the coil body 6 have central holes 6ab and 6bb for enclosing the central leg portion 5a of the E-type core 5, are configured by, for example, a copper winding having a specific electrical resistivity being wound a predetermined number of turns, and are stacked across an inter-winding insulating plate (not shown). Also, a core heat dissipating plate 7 is mounted across a thermal grease (not shown) on an upper face of the I-type core 4, and integrated as the transformer 2, which is an electromagnetic induction instrument.

Also, in a state wherein the central leg portion 5a of the E-type core 5 is caused to abut the opposing I-type core 4 while being passed through a central hole 6c provided in a center of the coil body 6, the I-type core 4 and the E-type core 5 are wound about multiple times with an adhesive tape (not shown) in a core longitudinal direction, thereby being temporarily fixed.

The transformer 2, which is an electromagnetic induction instrument, is disposed planarly in an interior of small compartment walls 3a of the frame body 3 configuring the power conversion device 1, as shown in FIG. 2, after which a gap between the small compartment walls 3a and the transformer 2, which is an electromagnetic induction instrument, is filled with a potting resin member 8. Being disposed planarly indicates a state wherein a core abutment interface 11 at which the I-type core 4 and the E-type core 5 are joined is disposed so as to be parallel to the bottom face of the frame body 3. Subsequently, the transformer 2 is fixed to the frame body 3 by a fixing member 9 separately fixed to a protruding portion 3b of the frame body 3 coming into contact with the core heat dissipating plate 7 of the transformer 2.

The coil body 6 configuring the transformer 2, which is an electromagnetic induction instrument, is configured in a form wherein the primary winding 6a, the secondary winding 6b, the inter-winding insulating plate (not shown), and a winding heat dissipating plate 6d are disposed stacked, and a periphery thereof is enveloped by molding using a molded resin 6e. In the first embodiment of the invention, the components are stacked from a lowermost portion in the order of the secondary winding 6b, the inter-winding insulating plate, the primary winding 6a, and the winding heat dissipating plate 6d. The stacking disposition is carried out with a gap having a predetermined size provided between the primary winding 6a and the winding heat dissipating plate 6d, and the gap is filled with the molded resin 6e.

As shown in FIG. 4 and FIG. 5, the primary winding 6a and the secondary winding 6b are configured of a spiral form sheet metal punched out from a metal plate of copper, aluminum, or the like using a press die or the like, have a rectangular cross-section, and have predetermined gaps between metal portions neighboring in a planar direction. The central holes 6ab and 6bb for passing the central leg portion 5a of the E-type core 5 through are provided in centers of the windings.

Instead of a configuration such that a metal plate is punched using a press die or the like, a configuration such that the windings are molded by a laser processing, an etching, or the like is also applicable. Also, terminal portions 6aa and 6ba of the primary winding 6a and the secondary winding 6b are both provided in an outer peripheral portion and an inner peripheral portion of the winding, and are configured by bending utilizing an outer peripheral portion of the sheet metal and one portion of the central hole. The inter-winding insulating plate (not shown) is a plate such that a resin material having insulating properties is molded, and protruding portions (not shown) are provided on both a front and back, and when the primary winding 6a and the secondary winding 6b are stacked on the inter-winding insulating plate, a position of each winding is determined by the winding being housed in a gap between the protruding portions.

Furthermore, protruding portions (not shown) are also provided in inner peripheral and outer peripheral portions of the insulating plate, and a protrusion height is set so that a creepage distance between the windings is of a predetermined numerical value when the primary winding 6a and the secondary winding 6b are disposed on the inter-winding insulating plate. When the winding heat dissipating plate 6d is disposed on the primary winding 6a, the disposition is such that a gap in which a resin of a predetermined thickness is interposed is provided between the winding heat dissipating plate 6d and the primary winding 6a. The coil body 6 is integrated by insert molding using the molded resin 6e, which has predetermined thermal conductivity and insulating properties, in a state wherein all components are stacked. With regard to the molded resin 6e of the coil body 6, molding is carried out in a form wherein one portion of the secondary winding 6b is exposed in the molded resin 6e so that the secondary winding 6b opposing a protruding portion 3c of the frame body 3 of FIG. 2 can come into contact with the potting resin member 8 (not shown).

The winding heat dissipating plate 6d is formed by a metal plate of aluminum, copper, or the like having a predetermined thermal conductivity being press-molded, and a bent portion 6da is provided in both end places exposed in the molded resin 6e. Also, the core heat dissipating plate 7 disposed on the I-type core 4 is formed by a metal plate of aluminum, copper, or the like having a predetermined thermal conductivity being press-molded, and a bent portion 7a is provided in both end portions.

After the transformer 2, which is an electromagnetic induction instrument, is housed in the interior of the small compartment walls 3a of the frame body 3, the interior is filled with the potting resin member 8 using a dispensing device or the like, and the potting resin member 8 is caused to harden under predetermined curing conditions, whereby the potting resin member 8 penetrates. Gaps between the primary winding 6a, the secondary winding 6b, the I-type core 4, and the E-type core 5 and the small compartment walls 3a are determined by the structures of the coil body 6 and the frame body 3. For example, positioning may be carried out by providing a positioning resin pin on the coil body 6 using the molded resin 6e, and providing a positioning hole for inserting the resin pin in the frame body 3. Note that a configuration may be such that the I-type core 4 and the E-type core 5 are not fixed to the coil body 6, and a core 21 is in contact with the bottom face of the frame body 3.

The potting resin member 8 is configured of a material such as a silicone resin, an epoxy resin, or a urethane resin, which has predetermined thermal conductivity and insulating properties. Also, as shown in FIG. 6, the configuration of the first embodiment of the invention is such that a filling height of the potting resin member 8 is restricted to a height such that an upper portion of the coil body 6 is not completely covered, or specifically, a height such that the I-type core 4 and the potting resin member 8 are not in contact, and there is a space 20.

After the transformer 2, which is an electromagnetic induction instrument, is housed in the frame body 3 and filling with the potting resin member 8 is carried out, the transformer 2 is fixed to the frame body 3 by the fixing member 9, which is fixed to the protruding portion 3*b* of the frame body 3 by a screw 10, as shown in FIG. 6. At the point at which the fixing member 9 is fixed to the frame body 3, the fixing member 9 comes into contact with an upper portion of the core heat dissipating plate 7 configuring the transformer 2, and is fixed by a predetermined load being applied.

The fixing member 9 in the first embodiment of the invention is a spring member formed by a metal plate of stainless steel or the like being press-molded, and is a member to which a predetermined load is applied in accordance with a predetermined displacement in a fixing place. The fixing member 9 is disposed above the transformer 2 so as to cover the I-type core 4, and an end portion of the fixing member 9 is attached to the protruding portion 3*b* of the frame body 3 by the screw 10, which is a fastening member. Further, the transformer 2, which is an electromagnetic induction instrument, is fixed to the frame body 3 by the fixing member 9. A formation region of the fixing member 9 disposed above the transformer 2 is limited to a formation region of the core 21.

As heretofore described, the power conversion device 1 of the first embodiment of the invention is such that, in particular, heat lost from the I-type core 4 and the E-type core 5 configuring the transformer 2, which is an electromagnetic induction instrument, can efficiently be caused to dissipate into the frame body 3 and the cooler (not shown), and a reduction in size of the transformer 2 owing to increased heat dissipation can be realized. As shown in FIG. 6, heat generated in the E-type core 5, which is a lower core, is dissipated into the cooler (not shown) via the opposing frame body 3, simultaneously with which heat generated in the I-type core 4, which is an upper core, is dissipated into the cooler via the thermal grease (not shown), the core heat dissipating plate 7, the potting resin member 8, and the frame body 3. By a heat dissipation path being provided for each of the I-type core 4 and the E-type core 5 in this way, heat lost from the core 21 of the transformer 2, which is an electromagnetic induction instrument, can efficiently be dissipated into the cooler.

Also, as shown in FIG. 6, a predetermined load is continuously applied to an upper portion of the transformer 2, which is an electromagnetic induction instrument, by the fixing member 9 fixed to the frame body 3, whereby, when the potting resin member 8 thermally expands due to a rise in temperature accompanying a generation of heat by the core 21 and the windings when the power conversion device 1 and the transformer 2 are driven, a formation of a gap at the core abutment interface 11 can be restricted. That is, a decrease in an inductance value of the transformer 2 due to a formation of a gap between the I-type core 4 and the E-type core 5 can be restricted, prevention of a deterioration in characteristics, such as a worsening of efficiency of the power conversion device 1, can be realized, and a function of the power conversion device 1 can be stabilized.

Also, by the filling height of the potting resin member 8 being restricted to a height such that the I-type core 4 and the potting resin member 8 are not brought into contact, and the space 20 exists, as shown in FIG. 6, filling of a gap between the coil body 6 and the I-type core 4 by the potting resin member 8, which causes a formation of a gap at the core abutment interface 11, is prevented, and potting resin member 8 thermal expansion itself can be restricted. Because of this, a decrease in the inductance value of the transformer 2 can be more reliably restricted, and the function of the power conversion device 1 can be further stabilized.

Figure 7:
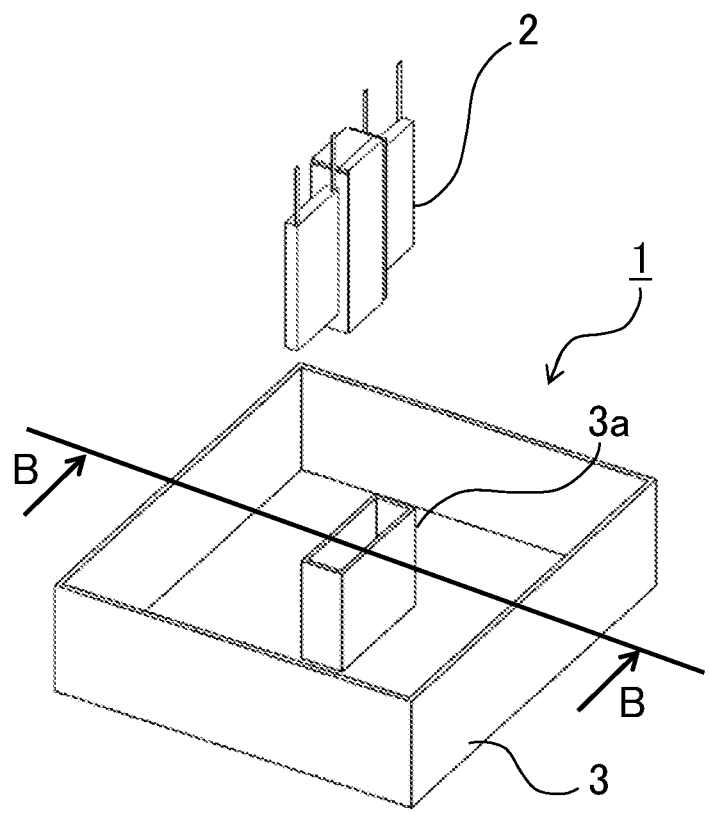
FIG. 7 is a perspective view showing a power conversion device as a comparative example.
Figure 8:
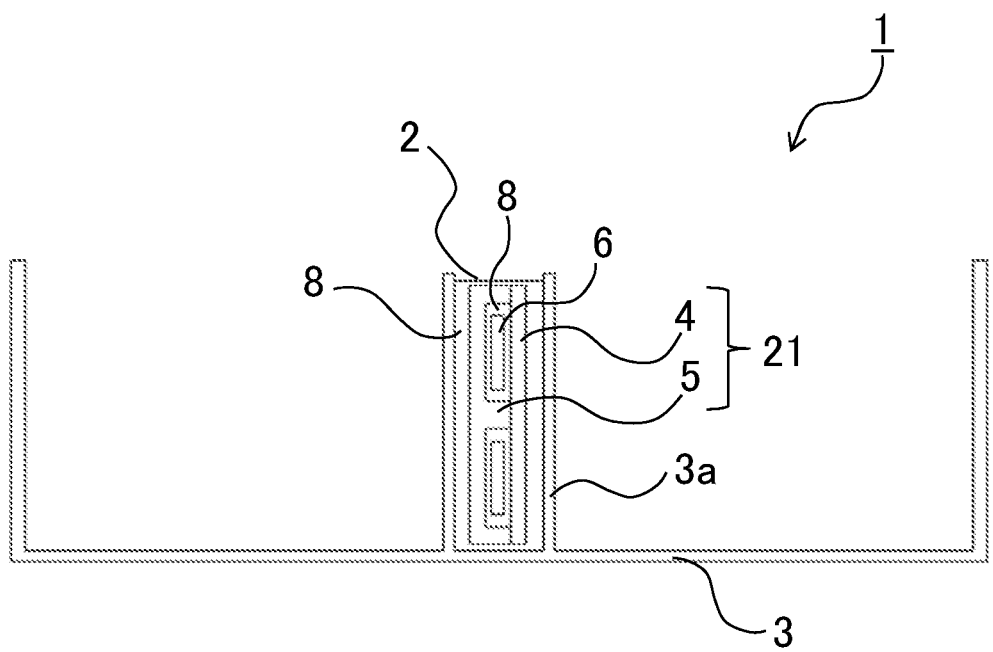
FIG. 8 is a sectional view showing a cross-section along a B-B line in the power conversion device shown in FIG. 7.

FIG. 7 is a perspective view showing a power conversion device according to a comparative example, and FIG. 8 is a sectional view of a cross-section along a B-B line in the power conversion device shown in FIG. 7. As shown in FIG. 7 and FIG. 8, the power conversion device 1 according to the comparative example is of a structure such that the small compartment walls 3*a* are installed inside the frame body 3, the transformer 2 is housed in an upright state in the interior of the small compartment walls 3*a*, and the interior is filled with the potting resin member 8. As shown in FIG. 8, the power conversion device 1 according to the comparative example is of a configuration such that the I-type core 4 and the E-type core 5 are sandwiched by the potting resin member 8 between the core 21 and the coil body 6 and the potting resin member 8 between the core 21 and the small compartment walls 3*a* of the frame body 3. Because of this, a load pressing on the I-type core 4 and the E-type core 5 is applied from both left and right faces due to thermal expansion of the potting resin member 8 caused by the power conversion device 1 being driven and the transformer 2 generating heat, because of which no separation force is generated at the core abutment interface 11. As no separation force acts on the cores, the inductance value of the transformer 2 does not decrease, and the function as the power conversion device 1 can be stabilized. Also, as the I-type core 4, the E-type core 5, and the coil body 6 are connected to the small compartment walls 3*a* of the frame body 3 across the potting resin member 8, there is an advantage in that heat lost from the core 21 and the coil body 6 can be efficiently dissipated into the frame body 3 and the cooler via the potting resin member 8.

However, as the power conversion device 1 according to the comparative example is such that the transformer 2 is housed in the frame body 3 in a state stood upright in a vertical direction, the height of the frame body 3 increases, as a result of which there is a problem in that a reduction in height and a reduction in size of the power conversion device 1 cannot be realized.

According to the first embodiment of the invention, the transformer 2 is disposed planarly in the frame body 3, as shown in FIG. 6, rather than the transformer 2 being disposed in a state stood upright in the vertical direction in the frame body 3, as in FIG. 7 and FIG. 8 showing the comparative example, whereby the height of the frame body 3 can be reduced, and a reduction in height of the power conversion device 1, and a reduction in size owing to the reduction in height, can be realized. Also, owing to the reduction in height and size, a reduction in weight and a reduction in cost of the power conversion device 1 can also be realized. Furthermore, as the power conversion device 1 can be reduced in height, an improvement in layout flexibility and a space saving in a vehicle in which the power conversion device 1 is mounted can also be achieved.

Also, by bringing the fixing member 9 fixed in advance to the frame body 3 in contact with the upper portion of the transformer 2, and continuously applying a predetermined load, the transformer 2 can be fixed to the frame body 3, and a securing of strength and vibration resistance of the transformer 2 and the power conversion device 1 can be realized, even when the power conversion device 1 is exposed to vibration or impact conditions when the vehicle is travelling.

Further still, by the fixing member 9 being configured of a spring member of stainless steel or the like, a predetermined load can be applied while absorbing a dimensional variation in the core 21 configuring the transformer 2, the core heat dissipating plate 7, and the like. Because of this, productivity when manufacturing can be improved, and cost at the manufacturing stage can be reduced.

Also, as shown in FIG. 6, the core 21, which forms a closed magnetic path, is divided in a center thereof, and is configured of the E-type core 5 and the I-type core 4. Herein, rather than two E-type cores 5 being used as the core 21, one core is configured of the E-type core 5, and the other is configured of the I-type core 4. Also, the I-type core 4 is disposed in an upper portion, which is a side distanced from the bottom face of the frame body 3. Because of this, a height position of the core abutment interface 11 can be disposed in a high position distanced as far as possible from the bottom face of the frame body 3, because of which the filling height (surface position) of the potting resin member 8 can be set to be high within a range wherein a formation of a gap in the core 21 due to thermal expansion of the potting resin member 8 is restricted. Because of this, an area of contact between the winding heat dissipating plate 6d and the potting resin member 8, and between the core heat dissipating plate 7 and the potting resin member 8, can be increased, and heat dissipation of the transformer 2 can be further increased.

By the filling height of the potting resin member 8 being restricted to a height such that the I-type core 4 and the potting resin member 8 are not brought into contact, and the space 20 exists, rather than being a height such that the transformer 2 is completely buried, an amount of the potting resin member 8 used per power conversion device 1 can be reduced, and the cost of the power conversion device 1 can be reduced. Furthermore, as the amount of the potting resin member 8 used can be reduced, a weight thereof can be reduced, as a result of which a reduction in weight of the power conversion device 1 can be realized.

Also, provided that the filling height of the potting resin member 8 is such that the space 20 exists, the filling height may be set to be a height such that the coil body 6 is completely covered. The winding heat dissipating plate 6d configuring the coil body 6 being completely covered by the potting resin member 8 means that, even supposing that a dielectric breakdown occurs between a winding and the winding heat dissipating plate 6d, an occurrence of a dielectric breakdown between the transformer 2 and the frame body 3 can be prevented because the potting resin member 8, which has insulating properties, is reliably interposed between the winding heat dissipating plate 6d and the frame body 3.

Also, by mounting the core heat dissipating plate 7 on an upper portion of the I-type core 4 configuring the transformer 2, bringing the fixing member 9, which is a spring member, into contact with the core heat dissipating plate 7, and fixing the fixing member 9 to the core heat dissipating plate 7, stress occurring due to a load of the fixing member 9 can be caused to disperse in the core heat dissipating plate 7. As a result of this, stress acting on the core 21 can be reduced further than when bringing the fixing member 9 directly into contact with the core 21, damage to the core 21 can be restricted, and long-term reliability of the core 21 and the transformer 2 can be improved. Also, reliability of the power conversion device 1 also increases. Furthermore, by using the core heat dissipating plate 7 and the fixing member 9 in combination, a balance between restricting a decrease in the inductance value of the transformer 2 and securing heat dissipation of the transformer 2 can be realized.

Also, by providing the bent portions 7a and 6da in both end portions of the core heat dissipating plate 7 and the winding heat dissipating plate 6d, the core heat dissipating plate 7 and the winding heat dissipating plate 6d can be reliably covered by the potting resin member 8 by adjusting lengths of the bent portion 7a and the bent portion 6da, even when the filling height of the potting resin member 8 is set to a low position. Because of this, heat lost from the core 21 and the windings can be transmitted to the potting resin member 8 from the core heat dissipating plate 7 and the winding heat dissipating plate 6d. Furthermore, by providing the bent portion 7a and the bent portion 6da, a projected area in a plane can be restricted, and a reduction in size of the transformer 2 can also be realized.

In the first embodiment of the invention, thermal grease is interposed between the I-type core 4 and the core heat dissipating plate 7, but the thermal grease may be omitted when thermal resistance between the I-type core 4 and the core heat dissipating plate 7 is not a problem, or when integration, joining, or the like is carried out using a separate member.

Also, in the first embodiment of the invention, the E-type core 5 and the I-type core 4 are used in the configuration of the core 21, wherein the side in contact with the frame body 3 is the E-type core 5 and the I-type core 4 is disposed on the opposite side, but when the separation force at the core abutment interface 11 due to thermal expansion of the potting resin member 8 is small, or the like, the E-type core 5 and the I-type core 4 may be changed to a reverse configuration. Also, rather than an EI configuration, the core form can be changed to both cores being E-type cores 5, or to an EER-type, a PQ-type, a UU-type, or the like, provided that a closed magnetic path can be configured while causing the core abutment interface 11 to be formed parallel to a surface direction when filling with the potting resin member 8 has been carried out.

In the first embodiment of the invention, the filling height of the potting resin member 8 is restricted, but the filling height of the potting resin member 8 may be increased when the separation force at the core abutment interface 11 due to thermal expansion of the potting resin member 8 is small, or when a load can be sufficiently applied by the fixing member 9, and a formation of a gap at the core abutment interface 11 can be restricted, or the like.

Also, in the first embodiment of the invention, the core heat dissipating plate 7 is disposed for core heat dissipation, but a configuration such that the core heat dissipating plate 7 is omitted may be adopted in a case such as when heat loss in the core 21 is small, and active heat dissipation is unnecessary.

In the first embodiment of the invention, the primary winding 6a and the secondary winding 6b configuring the transformer 2 are configured of a sheet metal punched out from a metal plate of copper, aluminum, or the like using a press die or the like, but an existing winding configured by winding a round wire, a rectangular wire, or the like, may be used.

In the first embodiment of the invention, an electromagnetic induction instrument configuring the power conversion device 1 is the transformer 2, but a reactor and a choke coil are also applicable.

Figure 9:
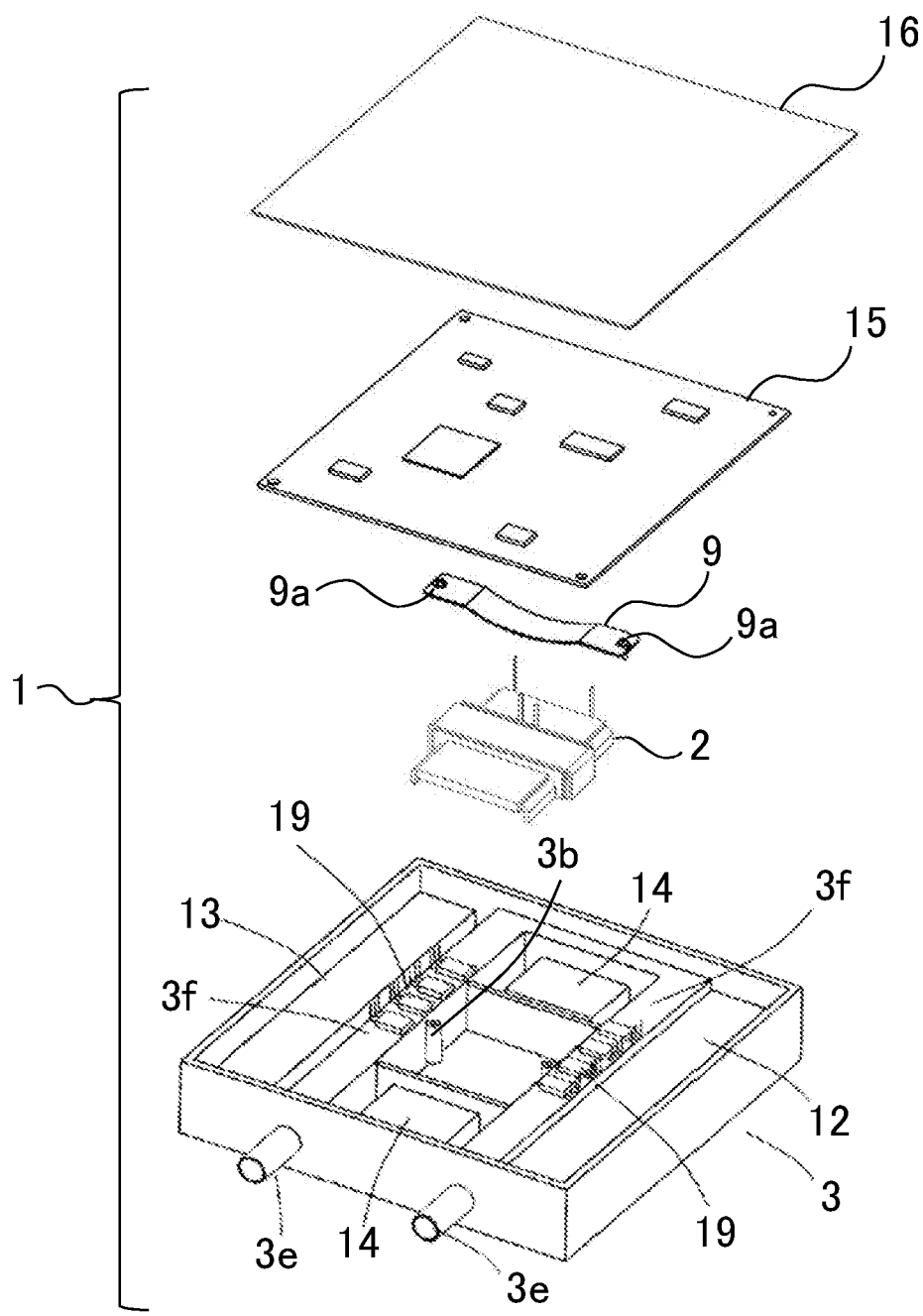
FIG. 9 is an exploded perspective view showing a whole of the power conversion device in the first embodiment of the invention.

FIG. 9 is an exploded perspective view showing a whole of the power conversion device in the first embodiment of the invention. As shown in FIG. 9, a filter circuit unit 12, a capacitor unit 13, and a reactor unit 14 are mounted in addition to the transformer 2 inside the frame body 3, and a water channel unit 3f of the frame body 3 is disposed so as to surround the transformer 2 and the reactor unit 14. A cooling fluid is supplied to an interior of the water channel unit 3f from a water channel pipe 3e. After the transformer 2 is housed inside the small compartment region of the frame body 3, filling with the potting resin member 8 is carried out, and the potting resin member 8 is cured. Subsequently, the fixing member 9 is disposed above the transformer 2, and a fixing portion 9a formed in an end portion of the fixing member 9 is fastened onto the protruding portion 3b of the frame body 3 using the screw 10, whereby the transformer 2 is fixed to the frame body 3.

Also, as shown in FIG. 9, a multiple of switching elements 19 for configuring the power conversion device 1, which is, for example, a converter that supplies power output by the transformer 2 to an external instrument, are mounted on an upper portion of the water channel unit 3f. A substrate unit 15 that implements wiring and control between components is mounted on an upper portion of the components mounted as previously described, and is connected to a terminal of each component by soldering or the like. Subsequently, a cover 16 joined to the frame body 3 is mounted on an upper portion of the substrate unit 15, and the frame body 3 and the cover 16 are fitted together by screw fastening or the like. The power conversion device 1 configured in this way is such that as the water channel unit 3f is disposed so as to surround the transformer 2 and the reactor unit 14, which are main heat generating components, heat lost from the transformer 2 and the reactor unit 14 can be efficiently dissipated from the water channel unit 3f on either side, and the switching element 19 too can dissipate heat, because of which a reduction in size and a reduction in cost of the power conversion device 1 can be realized.

Figure 10:
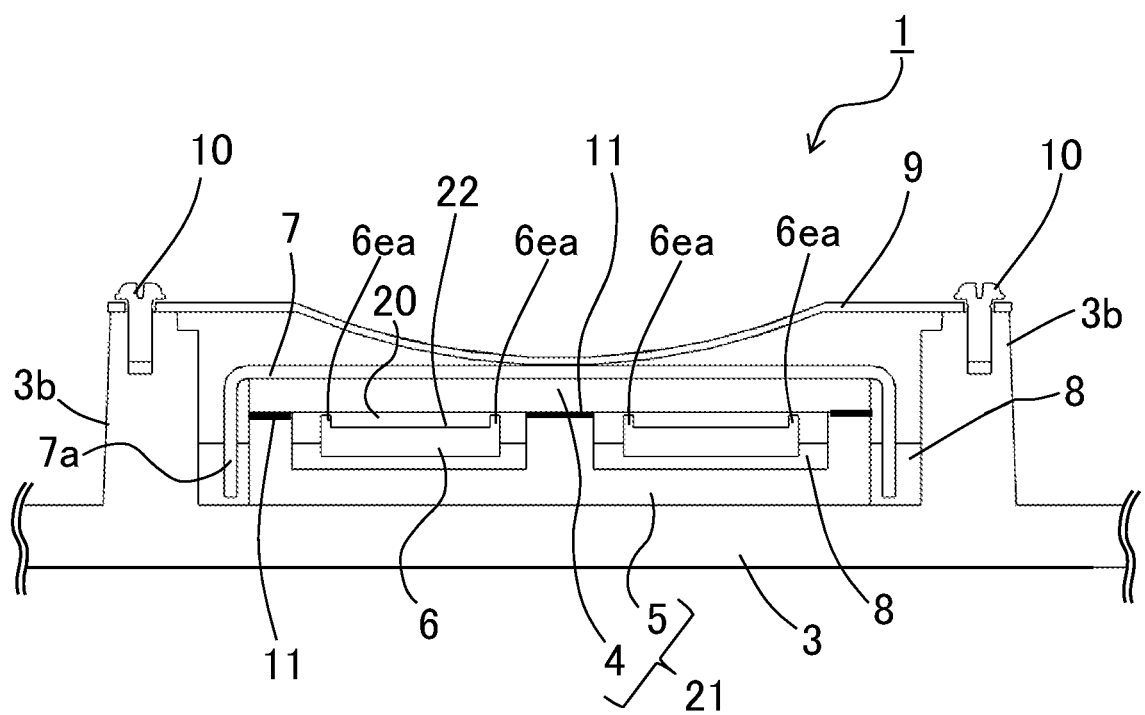
FIG. 10 is a sectional view showing a variation of the power conversion device in the first embodiment of the invention.

FIG. 10 is a sectional view showing a variation of the power conversion device in the first embodiment of the invention. As shown in FIG. 10, the variation of the power conversion device in the first embodiment of the invention is such that with regard to the molded resin 6e configuring the coil body 6, a protruding portion 6ea is formed by changing the form of the molded resin 6e. By the protruding portion 6ea being formed in the molded resin 6e, the protruding portion 6ea, or a recessed portion 22 configured by the protruding portion 6ea, is provided on a surface of the coil body 6, and the protruding portion 6ea of the coil body 6 is disposed so as to face the space 20 between the I-type core 4 and the coil body 6, as shown in FIG. 10. By configuring in this way, an advantage can be obtained in that when filling with the potting resin member 8, the potting resin member 8 overflowing at the filling stage is prevented from passing over the coil body 6 and filling the space 20 between the I-type core 4 and the coil body 6. The variation of the power conversion device in the first embodiment of the invention is such that filling of the space 20 can be more reliably prevented, because of which a decrease in the inductance of the transformer 2 can be more reliably prevented.

Figure 11:
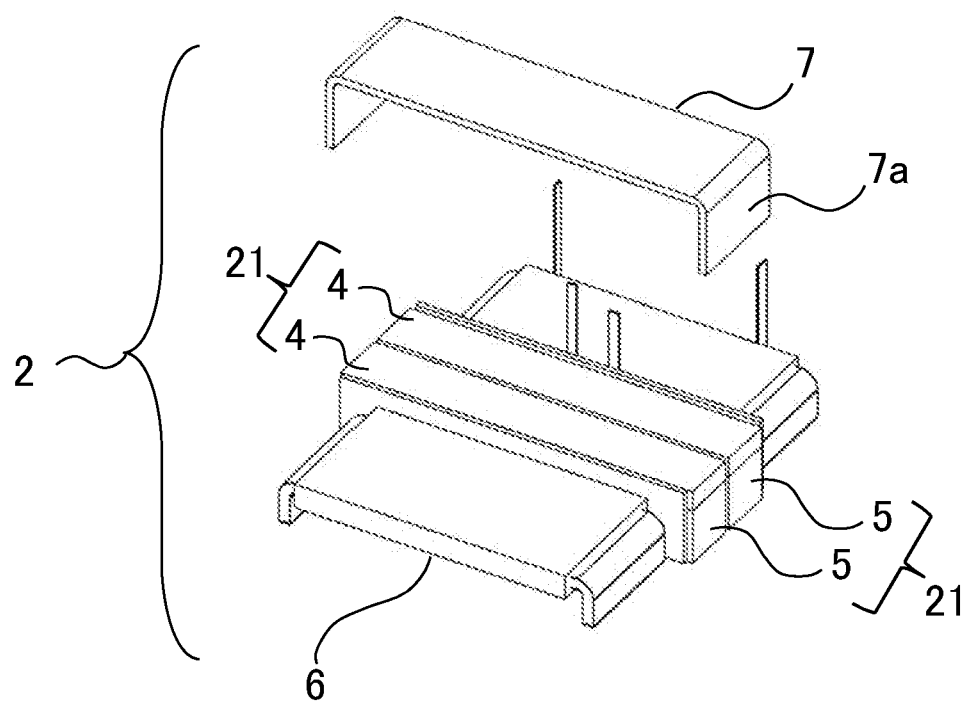
FIG. 11 is an exploded view showing a variation of the electromagnetic induction instrument in the first embodiment of the invention.

Also, FIG. 11 is an exploded view showing a variation of the electromagnetic induction instrument in the first embodiment of the invention. As shown in FIG. 11, a case of a configuration wherein the I-type core 4 and the E-type core 5 configuring the transformer 2 are divided is also applicable in the first embodiment of the invention. In this case, a height deviation in the divided core 21 occurring because of a height dimension tolerance can be absorbed by the core heat dissipating plate 7 being mounted on the core 21 across a thermal grease, an adhesive, or the like, and a predetermined load from the fixing member 9 can be reliably applied to each portion of the divided core 21. With regard to the divided core 21, it is not necessary that both the I-type core 4 and the E-type core 5 are divided, as a case wherein only either one is divided is also applicable.

In the first embodiment of the invention, the bent portion 7a is provided on the core heat dissipating plate 7, but when there is no need for reasons of core 21 heat dissipation for the bent portion 7a to be impregnated with the potting resin member 8, a configuration wherein the bent portion 7a is omitted, and another form such as a straight form is adopted, is also applicable.

Also, in the first embodiment of the invention, the fixing member 9 is configured as a both-end fixed spring member wherein the fixing portion 9a is provided in two places, but provided that the transformer 2 can be fixed by applying a predetermined load thereto, another form, such as a single-side fixed spring, is also applicable.

Second Embodiment

Figure 12:
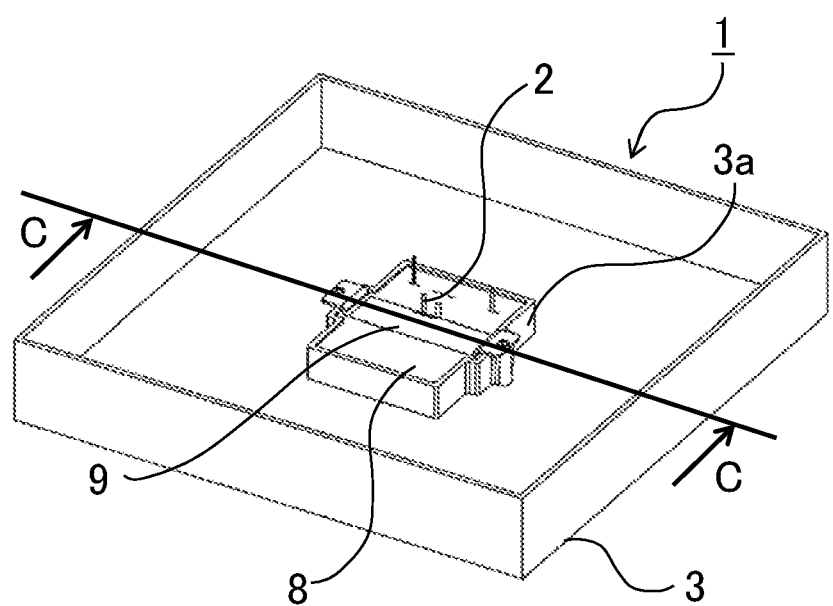
FIG. 12 is a perspective view showing a power conversion device in a second embodiment of the invention.
Figure 13:
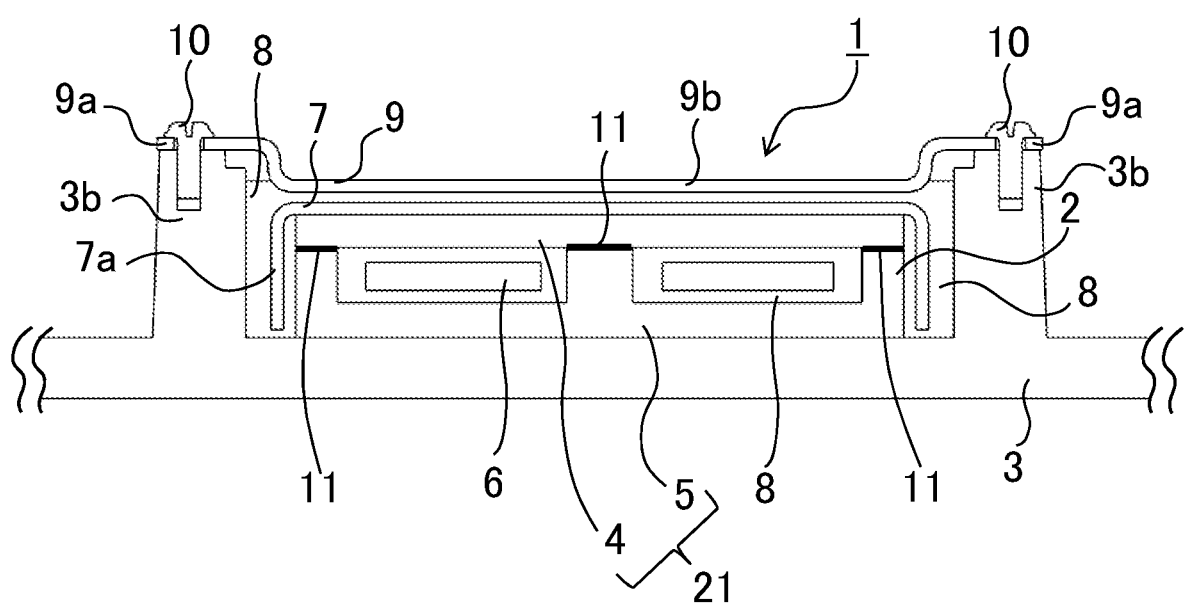
FIG. 13 is a sectional view showing a cross-section along a C-C line in the power conversion device of FIG. 12.
Figure 14:
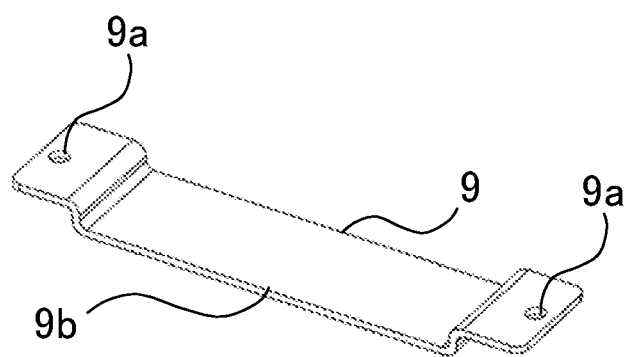
FIG. 14 is a perspective view showing a fixing member configuring the power conversion device in FIG. 12 and FIG. 13.

FIG. 12 is a perspective view showing a power conversion device according to a second embodiment of the invention, and FIG. 13 is a sectional view showing a cross-section along a C-C line in the power conversion device of FIG. 12. Also, FIG. 14 is a perspective view showing a fixing member configuring the power conversion device in FIG. 12 and FIG. 13. A substrate and other components mounted in the power conversion device are omitted from FIG. 12.

The power conversion device 1 in the second embodiment of the invention is such that the fixing member 9 fixing the transformer 2 is not in contact with the transformer 2, and the fixing member 9 is disposed above the transformer 2 across the potting resin member 8. Also, the power conversion device 1 according to the second embodiment of the invention is such that filling with the potting resin member 8 is carried out to a height such that the fixing member 9, including the transformer 2, is impregnated. In the second embodiment of the invention, the transformer 2 or the like, which is an electromagnetic induction instrument, and other configurations are the same as in the first embodiment.

As shown in FIG. 12 and FIG. 13, the transformer 2 is disposed planarly (so that the core abutment interface 11 is parallel to the bottom face of the frame body 3) inside the small compartment walls 3a of the frame body 3 configuring the power conversion device 1, after which the fixing member 9 is mounted on the protruding portion 3b of the frame body 3, and the fixing portions 9a at either end are fastened and fixed using the screw 10. A region in which a linear portion 9b of the fixing member 9 is disposed is above the core heat dissipating plate 7, and is limited to an extent of a region in which the I-type core 4 and the E-type core 5 are mounted (the linear portion 9b is not disposed above the winding heat dissipating plate 6d). The configuration is such that a predetermined gap is provided between the fixing member 9 fixed to the frame body 3 and the transformer 2. Subsequently, filling is carried out with the potting resin member 8 to a height such that the gap between the fixing member 9 and the transformer 2 is completely filled, and the potting resin member 8 is thermally cured under predetermined curing conditions, whereby the transformer 2 is fixed to the frame body 3 by the potting resin member 8 and the fixing member 9 in a state sandwiched by the frame body 3 and the fixing member 9.

As shown in FIG. 14, the fixing member 9 that fixes the transformer 2 is configured from a metal plate of iron, stainless steel, or the like, having a predetermined rigidity, and is formed by press-molding the metal plate. Also, the fixing member 9 is formed by a bending process being implemented so that the fixing member 9 is divided into the fixing portion 9a, which is mounted on and fixed to the protruding portion 3b of the frame body 3, and the linear portion 9b, which is disposed providing a predetermined gap with the upper portion of the transformer 2 and impregnated with the potting resin member 8.

The power conversion device 1 of the second embodiment of the invention configured in this way is such that, in addition to achieving the same advantages as in the first embodiment, the configuration is such that filling is carried out to a height wherein the gap between the transformer 2 and the fixing member 9 is completely filled with the potting resin member 8, because of which prevention of a gap from forming at the core abutment interface 11 can be realized. In particular, as the configuration is such that the I-type core 4 is sandwiched by the potting resin member 8 between the I-type core 4 and the coil body 6 and the potting resin member 8 between the core heat dissipating plate 7 and the fixing member 9, a load pressing on the I-type core 4 is applied from both upper and lower sides due to thermal expansion of the potting resin member 8 caused by the power conversion device 1 being driven and the transformer 2 generating heat. Because of this, prevention of the I-type core 4 being pulled away in an upward direction, and a gap being formed at the core abutment interface 11, can be realized. Because of this, the inductance value of the transformer 2 does not decrease, and stabilization of the function of the power conversion device 1 can be realized.

Also, as the filling height of the potting resin member 8 is such that filling is carried out to a height wherein the linear portion 9b of the fixing member 9 is impregnated, the transformer 2 is of a configuration completely covered by the potting resin member 8, and the area of contact (heat dissipation) between the core heat dissipating plate 7 and the potting resin member 8, and between the winding heat dissipating plate 6d and the potting resin member 8, increases further than in the first embodiment. Because of this, heat dissipation in the core and the windings can be further improved, and the transformer 2 can be further reduced in size. Also, by the transformer 2 being reduced in size, a reduction in size, a reduction in weight, and a reduction in cost of the power conversion device 1 can be realized.

Also, as the configuration is such that the fixing member 9 is fixed without being brought directly into contact with the transformer 2, stress generated in the I-type core 4 and the E-type core 5 can be considerably further reduced, a probability of a failure such as core damage can be reduced, and the reliability of the power conversion device 1 can be increased.

Also, as shown in FIG. 14, a difference in height is provided so that the fixing member 9 is divided into the fixing portion 9a and the linear portion 9b, and only the linear portion 9b is covered by the potting resin member 8, because of which the potting resin member 8 can be prevented from encroaching into a screw fastening hole of the protruding portion 3b of the frame body 3, and an improvement in productivity at the manufacturing stage, and a reduction in manufacturing cost, can be realized.

Also, by the region in which the linear portion 9b of the fixing member 9 is disposed being above the core heat dissipating plate 7 and limited to the extent of the region in which the I-type core 4 and the E-type core 5 are mounted, rather than being a whole of a plane of projection of the transformer 2, a volume of the fixing member 9 can be restricted to the minimum necessary, a weight increase can be restricted, and cost can be restricted.

In the second embodiment of the invention, two metal members, those being the fixing member 9 and the core heat dissipating plate 7, are used, but when heat loss in the core 21 is of an extent such as not to be a problem, the function of the core heat dissipating plate 7 can be integrated in the fixing member 9, and the core heat dissipating plate 7 can be omitted. In this case, the number of components of the transformer 2 can be reduced, and a further reduction in height and size, a reduction in weight, and a reduction in cost can be realized.

Third Embodiment

Figure 15:
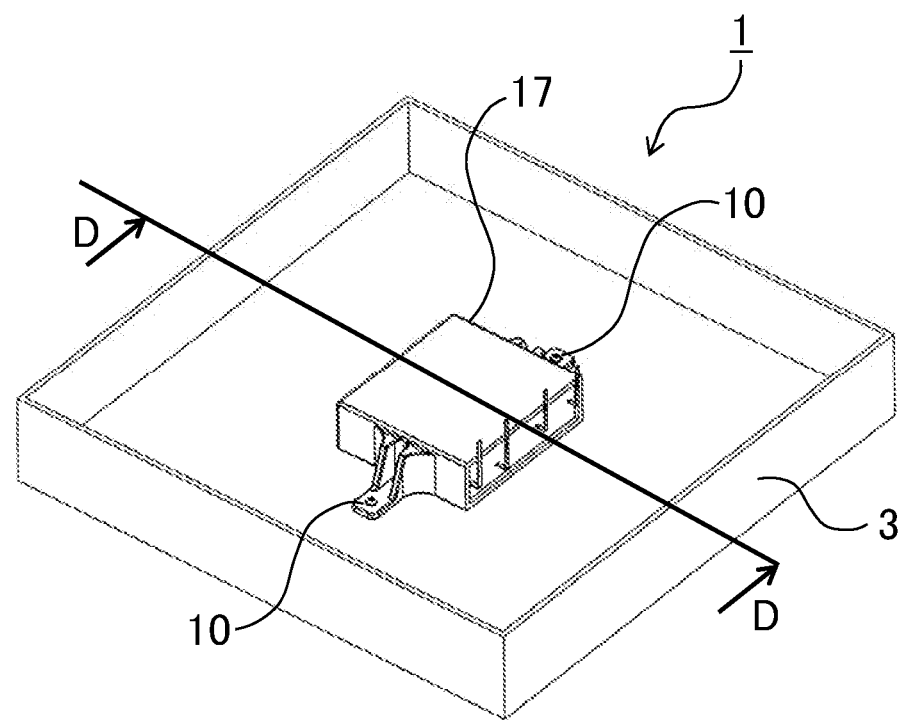
FIG. 15 is a perspective view showing a power conversion device in a third embodiment of the invention.
Figure 16:
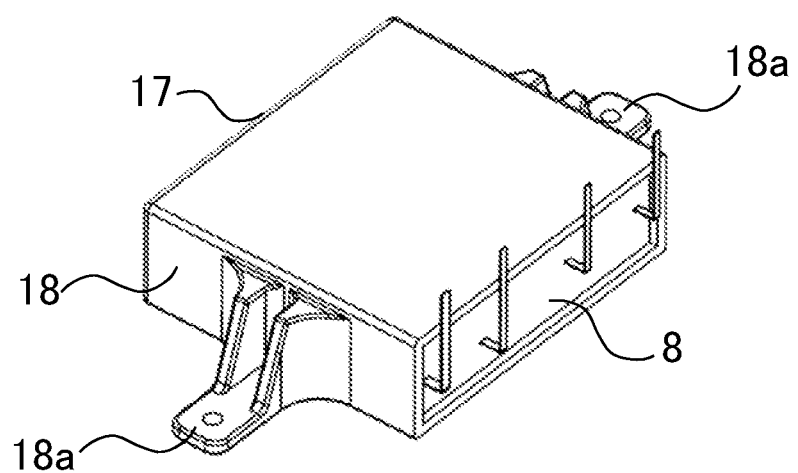
FIG. 16 is a perspective view showing a transformer module configuring the power conversion device of FIG. 15.
Figure 17:
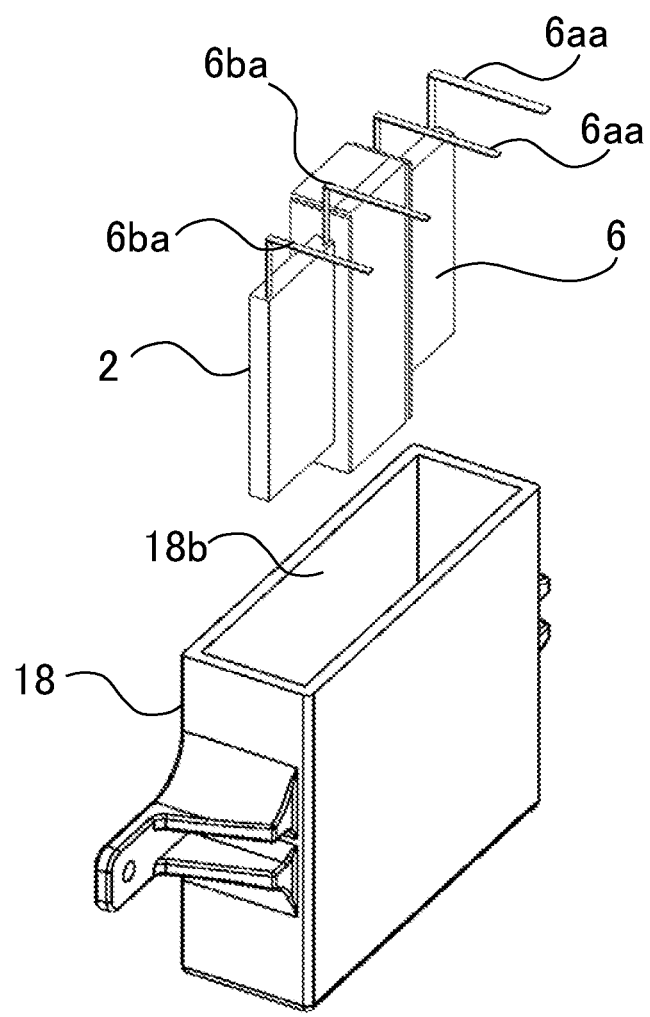
FIG. 17 is an exploded view of the transformer module of FIG. 16.
Figure 18:
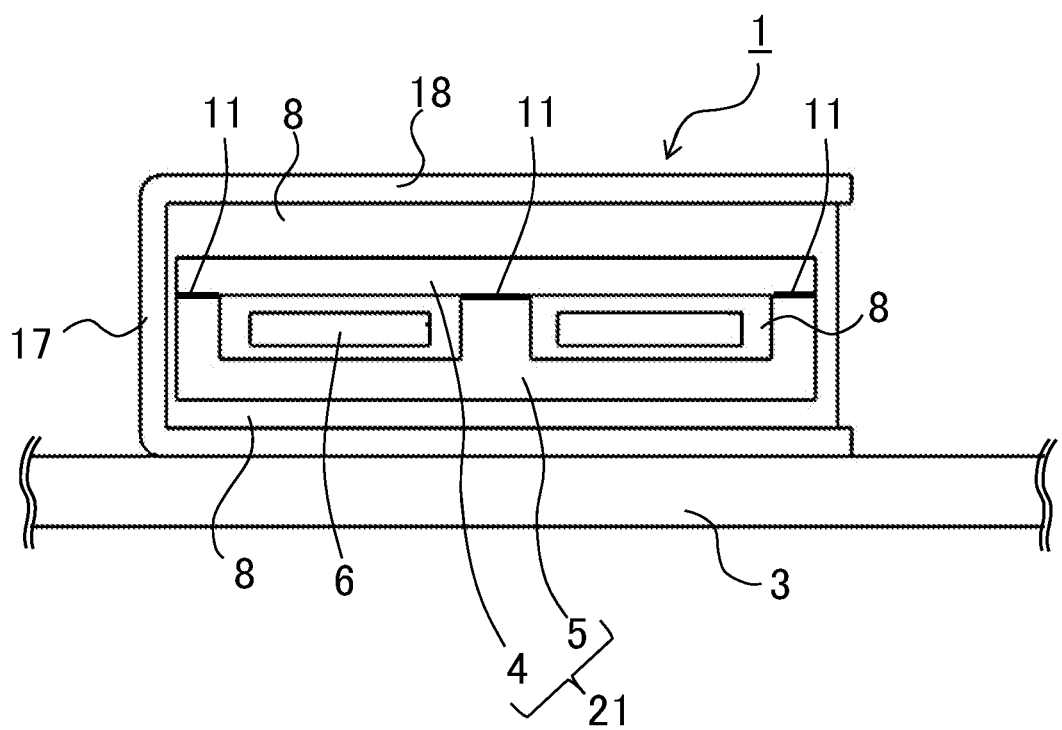
FIG. 18 is a sectional view showing a cross-section along a D-D line in the power conversion device of FIG. 15.

FIG. 15 is a perspective view showing a power conversion device in a third embodiment of the invention, and FIG. 16 is a perspective view showing a transformer module configuring the power conversion device of FIG. 15. Also, FIG. 17 is an exploded view of the transformer module of FIG. 16, and FIG. 18 is a sectional view showing a cross-section along a D-D line in the power conversion device of FIG. 15. A substrate and other components mounted in the power conversion device are omitted from FIG. 15. The transformer 2 configuring the power conversion device of the third embodiment of the invention is housed in advance in a case 18, and configured as a transformer module 17 filled with the potting resin member 8, and the transformer module 17 is mounted on and fixed to the frame body 3.

As shown in FIG. 16 and FIG. 17, the transformer 2 is configured as the transformer module 17 by being housed in advance in the case 18, after which the case 18 is filled with the potting resin member 8, whereby the transformer 2 is fixed to and integrated with the case 18. A position of the transformer 2 in the case 18 is determined by a jig, or a positioning pin (not shown) provided in the molded resin 6e of the coil body 6 configuring the transformer 2, being inserted into a positioning hole (not shown) provided separately in the case 18. The case 18 is configured of a component cast from a metal material having a predetermined rigidity and thermal conductivity, such as a diecast aluminum, or of a machined component. The primary winding terminal portion 6aa and the secondary winding terminal portion 6ba configuring the coil body 6 of the transformer 2 are drawn out from an aperture portion 18b of the case 18, and configured in a form such that a predetermined distance from the case 18 is secured. The transformer 2 in the third embodiment of the invention is configured without the core heat dissipating plate 7 or the winding heat dissipating plate 6d being provided.

The transformer module 17 configured in advance is disposed across a thermal grease (not shown) on the bottom face of the frame body 3, and fixed to the frame body 3 by a fixing portion 18a provided on the case 18 configuring the transformer module 17 being fastened and fixed to the frame body 3 using the screw 10. The aperture portion 18b of the case 18 of the mounted transformer module 17 is disposed so as to be in a vertical direction with respect to the bottom face of the frame body 3, and fixed to the frame body 3.

As shown in FIG. 18, the power conversion device 1 of the third embodiment of the invention is of a configuration wherein the I-type core 4 and the E-type core 5 configuring the transformer 2 are both sandwiched by the potting resin member 8 between the core 21 and the coil body 6 and the potting resin member 8 between the case 18 and the core 21. According to this kind of configuration, a load pressing on the core 21 is applied from both upper and lower sides due to thermal expansion of the potting resin member 8 caused by the power conversion device 1 being driven and the transformer 2 generating heat, because of which prevention of a gap from forming at the core abutment interface 11 can be realized. The power conversion device 1 of the third embodiment of the invention configured in this way is such that, in addition to achieving the same advantages as in the first embodiment and the second embodiment, the inductance value of the transformer 2 does not decrease, and stabilization of the function of the power conversion device 1 can be realized.

Also, as the aperture portion 18b of the case 18 is disposed so as to be in a vertical direction with respect to the bottom face of the frame body 3, a wall of the case 18 can be caused to exist opposing each of the I-type core 4 and the E-type core 5 disposed planarly with respect to the bottom face of the frame body 3, and as the case 18 is configured of a metal material having a predetermined thermal conductivity, such as a diecast aluminum, heat lost from the I-type core 4 and the E-type core 5 can be efficiently dissipated into the frame body 3 and the cooler via the potting resin member 8 and the case 18. As heat dissipation of the transformer 2 can be improved, a reduction in size, a reduction in weight, and a reduction in cost of the transformer 2 and the power conversion device 1 can be realized.

Also, in the third embodiment of the invention, the transformer module 17 is configured using the case 18, because of which prevention of a decrease in the inductance value of the transformer 2 can be realized by the case 18 functioning as a fixing member, and a balance between securing heat dissipation and vibration resistance of the transformer 2 can be realized.

Also, after the transformer 2 is housed in the case 18, filling is carried out with the potting resin member 8, whereby the transformer 2 is integrated as the transformer module 17, and the transformer module 17 is fastened and fixed to the frame body 3, because of which securing of sufficient vibration resistance can be realized, and the reliability of the power conversion device 1 increases.

Also, by the primary winding terminal portion 6aa and the secondary winding terminal portion 6ba configuring the coil body 6 of the transformer 2 being drawn out from the aperture portion 18b of the case 18, and configured in such a way as to secure a predetermined distance from the case 18, electrical insulation of the transformer 2 and the case 18 can be reliably implemented, and the function of the power conversion device 1 can be stabilized.

Although not shown in the drawings, the coil body 6 configuring the transformer 2 is configured in a form such that one portion of the primary winding 6a and of the secondary winding 6b is exposed in the molded resin 6e so that the primary winding 6a and the secondary winding 6b opposing a wall face of the case 18 can come into contact with the potting resin member 8, whereby heat lost from each winding can be efficiently dissipated into the frame body 3 and the cooler via the potting resin member 8 and the case 18. Because of this, the winding heat dissipating plate 6d of the first embodiment and the second embodiment can be omitted, and a reduction in the number of components, a reduction in weight, and a reduction in cost can be realized. Also, although not shown, by adopting a form wherein a protruding portion is provided only in wall face portions of the case 18 opposing the primary winding 6a and the secondary winding 6b, thereby bringing the wall face nearer to each winding portion, a thickness of the potting resin member 8 between the windings and the case 18 can be reduced, and the heat dissipation of the windings can be further increased.

In the third embodiment of the invention, the case 18 and the frame body 3 are joined across an interposed thermal grease, but sealing at a contact interface between the case 18 and the frame body 3 can thereby be improved, and the heat dissipation of the transformer 2 can be improved. When thermal resistance at the contact interface is not a problem, or when wishing to connect electrically using the case 18 and the frame body 3, or the like, configuring without grease is also applicable.

Also, in the third embodiment of the invention, the case 18 is configured of a component separate from the frame body 3, but configuring by integrating the function of the case 18 in the frame body 3 is also applicable. In this case, the case 18 is omitted, whereby the number of components can be reduced, and a reduction in cost and a reduction in weight of the power conversion device 1 can be realized.

Fourth Embodiment

Figure 19:
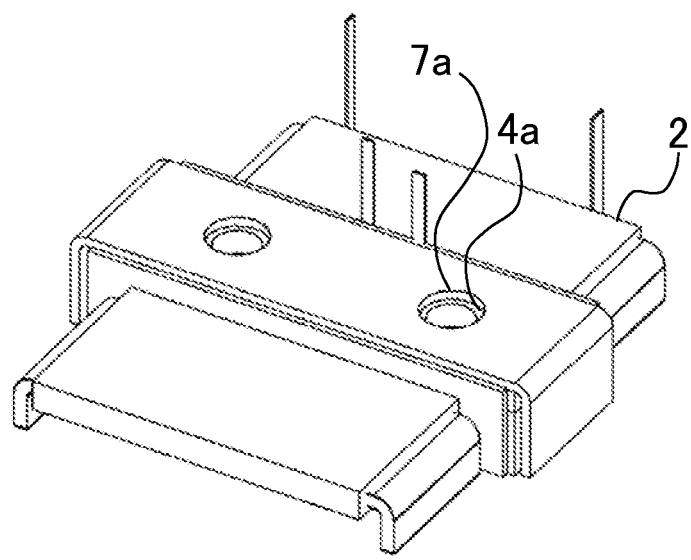
FIG. 19 is a perspective view showing an electromagnetic induction instrument in a fourth embodiment of the invention.
Figure 20:
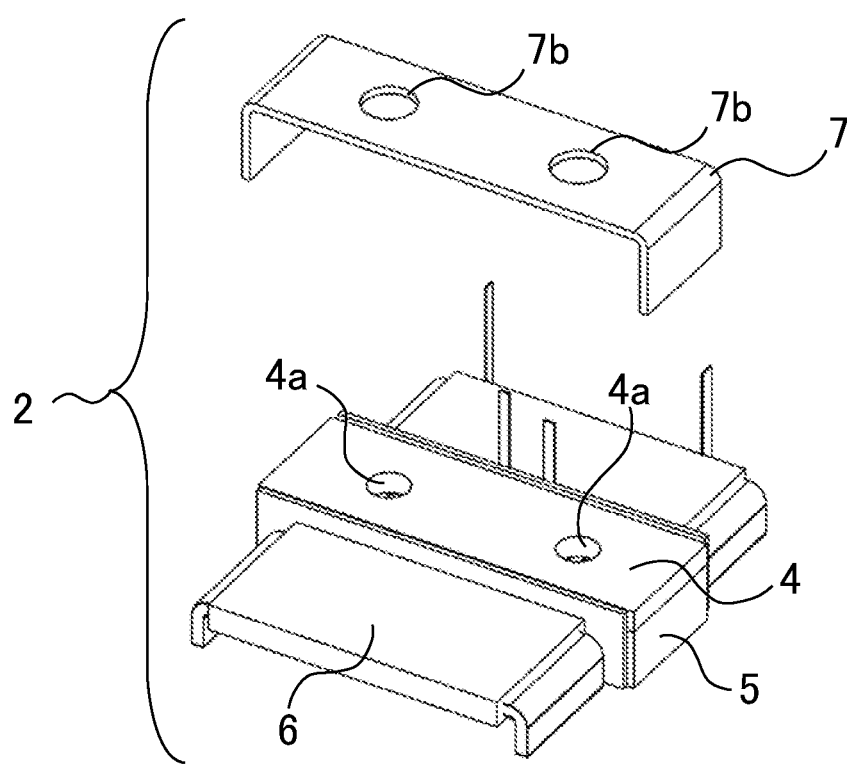
FIG. 20 is an exploded view of the electromagnetic induction instrument of FIG. 19.
Figure 21:
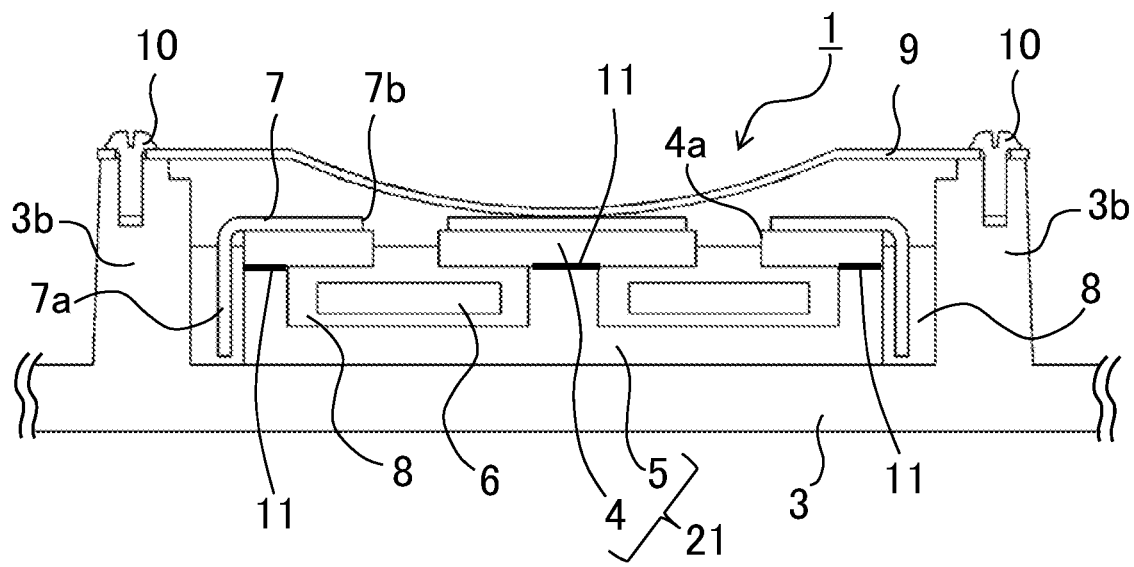
FIG. 21 is a sectional view of the power conversion device in which the electromagnetic induction instrument of FIG. 19 is mounted.

FIG. 19 is a perspective view showing an electromagnetic induction instrument configuring a power conversion device in a fourth embodiment of the invention, and FIG. 20 is an exploded view of a transformer, which is the electromagnetic induction instrument of FIG. 19. Also, FIG. 21 is a sectional view of the power conversion device in which the electromagnetic induction instrument of FIG. 19 is mounted. A frame body, a substrate, and other components configuring the power conversion device are omitted from FIG. 19.

As shown in FIG. 19 and FIG. 20, the transformer 2 configuring the power conversion device 1 of the fourth embodiment of the invention differs from that of the first embodiment and the second embodiment in having a hole portion 4a and a through hole portion 7b respectively in the I-type core 4 and the core heat dissipating plate 7, which are components. Other configurations of the fourth embodiment are the same as in the first embodiment and the second embodiment.

As shown in FIG. 19 and FIG. 20, the fourth embodiment of the invention is such that the hole portion 4a, which penetrates the I-type core 4, is provided and molded in the I-type core 4 configuring the transformer 2. Also, the through hole portion 7b is provided and molded corresponding to an upper portion of the hole portion 4a in the core heat dissipating plate 7 disposed on the upper portion of the I-type core 4.

As heretofore described, the power conversion device 1 having the transformer 2 of the fourth embodiment of the invention is such that filling with the potting resin member 8 is carried out using the same configuration as in the first embodiment, and the transformer 2 is fixed to the frame body 3 using the fixing member 9, as shown in, for example, FIG. 21. By providing the hole portion 4a penetrating the I-type core 4, as shown in FIG. 21, the projected area opposing the coil body 6 can be reduced with respect to the case of the first embodiment, because of which the separation force at the core abutment interface 11 due to thermal expansion of the potting resin member 8 can be restricted even when a space portion between the I-type core 4 and the coil body 6 is filled with the potting resin member 8, and stress generated can be released into an external space through the hole portion 4a and the through hole portion 7b. Because of this, the filling height of the potting resin member 8 can be increased, and the area of contact between the core heat dissipating plate 7 configuring the transformer 2 and the potting resin member 8, and between the winding heat dissipating plate 6d and the potting resin member 8, is increased, because of which the heat dissipation of the transformer 2 can be further increased, and a reduction in size, a reduction in weight, and a reduction in cost of the transformer 2 can be realized. Also, a reduction in size, a reduction in weight, and a reduction in cost of the power conversion device 1 owing to the reduction in size of the transformer 2 can be realized.

Also, as the separation force at the core abutment interface 11 due to thermal expansion of the potting resin member 8 can be restricted, the pressing load of the fixing member 9 can be reduced, and an increase in freedom of design and a reduction in cost can be realized.

In FIG. 21, the power conversion device 1 is configured using the same structure as in the first embodiment, but the kind of structure of the second embodiment wherein the fixing member 9 is not brought into contact with the transformer 2 is also applicable.

Also, in the fourth embodiment of the invention, a configuration such that the hole portion 4a is provided in the I-type core 4 is adopted as a structure wherein the projected area of the opposing I-type core 4 and coil body 6 is reduced, but not being limited to the hole portion 4a, configuring in a different form is also applicable provided that the projected area of the opposing core and coil body 6 can be reduced.

The embodiments of the invention can be freely combined, and each embodiment can be modified or abbreviated as appropriate, without departing from the scope of the invention.

REFERENCE SIGNS LIST 1 power conversion device, 2 transformer, 3 frame body, 4 I-type core, 5 E-type core, 6 coil body, 6a primary winding, 6b secondary winding, 6d winding heat dissipating plate, 7 core heat dissipating plate, 8 potting resin member, 9 fixing member, 10 screw, 11 core abutment interface, 12 filter circuit unit, 13 capacitor unit, 14 reactor unit, 15 substrate unit, 16 cover, 17 transformer module, 18 case, 19 switching element, 20 space, 21 core, 22 recessed portion

The invention claimed is:

1. A power conversion device, comprising:
an electromagnetic induction instrument wherein an upper core and a lower core having magnetism are electromagnetically coupled across a coil body;
a frame body on which the electromagnetic induction instrument is mounted;
a potting resin member with which a first space between the frame body and the electromagnetic induction instrument is filled and with which a second space between the lower core and the coil body is filled; and
a fixing member, disposed above the electromagnetic induction instrument so as to cover the upper core, of which an end portion is attached to the frame body, wherein
the electromagnetic induction instrument is fixed to the frame body by the fixing member.

2. The power conversion device according to claim 1, wherein filling is carried out so that a surface of the potting resin member is parallel to an abutment interface between the upper core and the lower core, and
the electromagnetic induction instrument is disposed planarly so that the abutment interface is parallel to a bottom face of the frame body.

3. The power conversion device according to claim 2, wherein a filling height of the potting resin member is set to a height on a lower side of the abutment interface, or a height such that a gap space between the upper core and the coil body is not filled with the potting resin member.

4. The power conversion device according to claim 3, wherein the abutment interface is configured so as to be above the coil body.

5. The power conversion device according to claim 1, wherein the fixing member is configured of a spring member that applies a load to the electromagnetic induction instrument.

6. The power conversion device according to claim 1, wherein there is a space between the upper core and the fixing member, and filling with the potting resin member is carried out to a height such that the space is completely filled.

7. The power conversion device according to claim 6, wherein the fixing member has a stepped form configured of a fixing portion that is fixed to the frame body and a linear portion that is brought into contact with the potting resin member.

8. The power conversion device according to claim 3, wherein the coil body is configured by a multiple of windings being enveloped by a molded resin, a protruding portion or a recessed portion is formed in the molded resin, and
the protruding portion or the recessed portion of the coil body is disposed so as to face the gap space between the upper core and the coil body.

9. The power conversion device according to claim 1, wherein a heat dissipating plate formed of a metal member is disposed between the upper core and the fixing member.

10. The power conversion device according to claim 1, wherein a formation region of the fixing member disposed above the electromagnetic induction instrument is limited to a core formation region.

11. The power conversion device according to claim 1, wherein a hole portion is provided in the upper core, and the hole portion is disposed above the coil body.

12. A power conversion device, comprising:
an electromagnetic induction instrument wherein an upper core and a lower core having magnetism are electromagnetically coupled across a coil body;
a metal case in which the electromagnetic induction instrument is housed through one opened face;
a frame body on which the metal case is mounted; and
a potting resin member with which a first space between the metal case and the electromagnetic induction instrument is filled and with which a second space between the lower core and the coil body is filled, wherein
the electromagnetic induction instrument is fixed to the frame body by the metal case, and the opened face of the metal case is disposed so as to be in a vertical direction with respect to a bottom face of the frame body.

13. The power conversion device according to claim 2, wherein a heat dissipating plate formed of a metal member is disposed between the upper core and the fixing member.

14. The power conversion device according to claim 2, wherein a formation region of the fixing member disposed above the electromagnetic induction instrument is limited to a core formation region.

15. The power conversion device according to claim 2, wherein a hole portion is provided in the upper core, and the hole portion is disposed above the coil body.

16. The power conversion device according to claim 3, wherein a heat dissipating plate formed of a metal member is disposed between the upper core and the fixing member.

17. The power conversion device according to claim 3, wherein a formation region of the fixing member disposed above the electromagnetic induction instrument is limited to a core formation region.

18. The power conversion device according to claim 3, wherein a hole portion is provided in the upper core, and
the hole portion is disposed above the coil body.

* * * * *